July 14, 1959     J. F. RAMPE     2,894,406
SHOCK ABSORBING DRIVE FOR TUMBLING DRUMS AND THE LIKE
Filed March 11, 1957     2 Sheets-Sheet 1

INVENTOR.
John F. Rampe
BY Bosworth, Sessions, Herrstrom and Knowles
ATTORNEYS

July 14, 1959 J. F. RAMPE 2,894,406
SHOCK ABSORBING DRIVE FOR TUMBLING DRUMS AND THE LIKE
Filed March 11, 1957 2 Sheets-Sheet 2
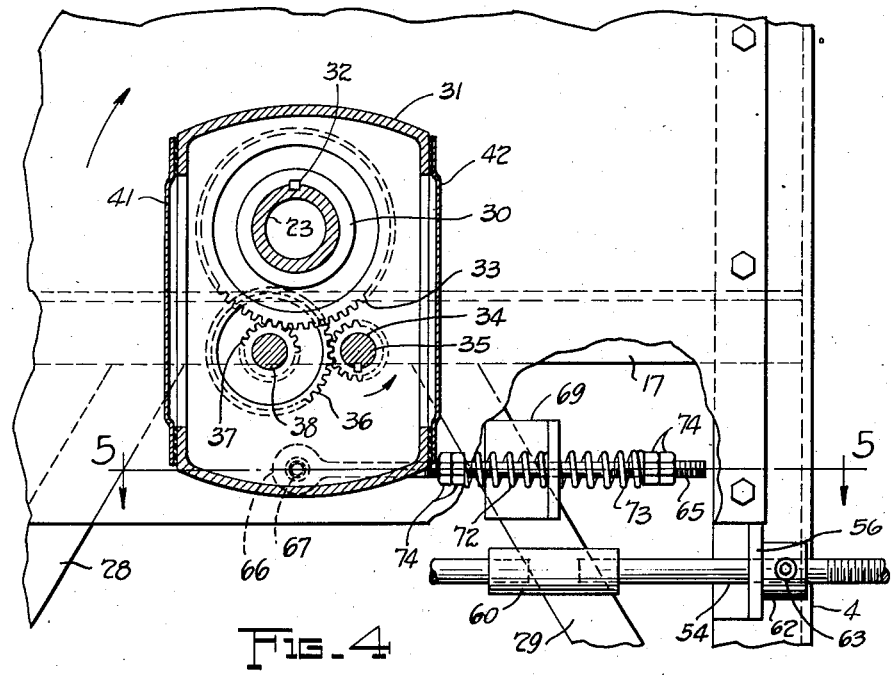
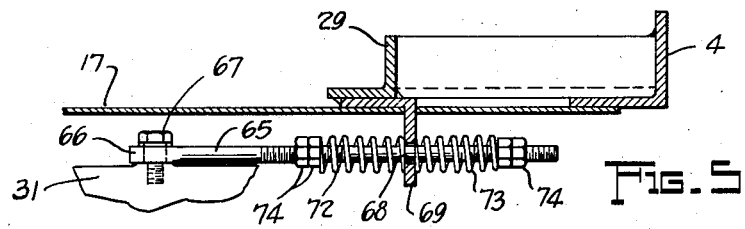
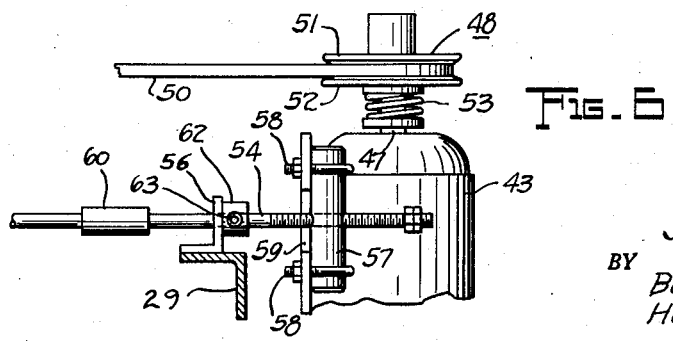
INVENTOR.
John F. Rampe
BY Bosworth, Sessions,
Herrstrom and Knowles
ATTORNEYS 2,894,406
Patented July 14, 1959

2,894,406
SHOCK ABSORBING DRIVE FOR TUMBLING DRUMS AND THE LIKE

John F. Rampe, Cleveland Heights, Ohio

Application March 11, 1957, Serial No. 645,330

4 Claims. (Cl. 74—230.17)

This invention relates to drive mechanisms for rotary shafts of machines and more particularly to speed reducing drives wherein a heavy relatively low speed load is actuated by a relatively high speed prime mover.

The present invention is applicable to advantage in a tumbler machine wherein one or more drums are rotated at relatively slow speed, usually from about 10 to about 50 r.p.m., by a standard electric motor running at conventional speed such as about 1800 r.p.m. or about 3300 r.p.m. In a drive of the character referred to the irregular movements of the contents of the tumbling drum or drums cause variations in the magnitude of the load transmitted between the prime mover and the drum or drums. As a result of such load variations in tumblers their drives are subjected to irregular shock loads that cause heavy wear on gears, pinions and bushings and it has heretofore been necessary to employ drive components much heavier and stronger than would be used to transmit the average power used.

It is one of the principal objects of the present invention to provide a speed reducing rotary drive system which cushions shock loads, thereby minimizing wear and preventing chipping and breaking of gear teeth and permitting the use of light weight parts with attendant simplicity and economy.

Another object is to provide a drive that can be readily adjusted to different speed ratios between driving and driven components without interrupting the driving connection and without stopping the rotary motion of either the prime mover or the load being actuated.

A further object is to provide such a drive system having a gear train unit or speed reducing assembly mounted on the main driven shaft of the machine and actuated by an electric motor separately mounted on the frame of the machine and connected to the input shaft of the gear train by an endless belt. The gear train is yieldingly restrained against rotation about the axis of the driven shaft on which it is supported for absorption of irregular and shock loads transmitted to the gear train by such shaft. More specifically the speed reducer comprises a conventional gear train contained in a housing supported on the shaft of the machine, the housing being connected to the machine frame through one or more springs so that such spring or springs are energized by forces imparted to the gear housing through the main shaft and which tend to rotate the housing about the axis of such shaft.

A still further object is to provide, in combination with a heavy duty machine drive having a shaft mounted speed reducing gear assembly, a drive motor mounted on the machine frame for bodily movement toward and away from the gear housing and connected thereto by an endless belt trained over pulleys, and an adjustable diameter pulley on either the input shaft of the speed reducer or the motor shaft, preferably on the latter, so that by means of the endless belt connecting the motor shaft to the input shaft of the speed reducer the driving ratio is varied both manually by motor shifting and automatically in accordance with the relative positions of the cushioned speed reducer and the motor.

Other objects and advantages relating to certain novel features of construction and combinations and arrangements of parts are set forth in the following detailed description of a preferred embodiment of the invention which represents the best known mode of practicing its principles. This description is made in connection with the accompanying drawings forming a part of the specification.

In the drawings:

Fig. 4 is a fragmentary end elevational detail partly in section and with parts broken away and removed, this view being enlarged from and corresponding to Fig. 2;

Fig. 5 is a fragmentary sectional detail taken substantially in the plane represented by the line 5—5 of Fig. 4; and Fig. 6 is a fragmentary detail of the motor and the speed adjusting components associated with the motor, this view being taken substantially in the plane indicated by the line 6—6 of Fig. 2 and enlarged with respect to that figure.

Figures 1, 2, 3:
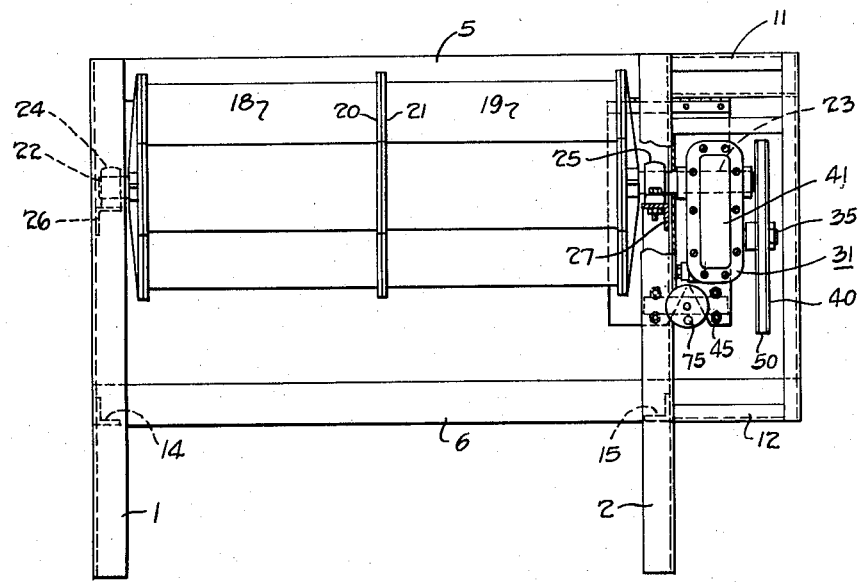
Fig. 1 is an elevational view partly in section and with parts broken away and removed showing a tumbler having a cantilever shaft on which is suspended a belt driven speed reducing gear assembly.
Fig. 2 is an end elevational view of the right hand end of the tumbler of Fig. 1.
Fig. 3 is a fragmentary elevational view of the rear of the tumbler of Fig. 1 showing the opposite side of the drive of Fig. 1.

The cushioned drive arrangement of the present invention can be readily adapted to various machines employing a prime mover such as an electric motor for actuating a heavy rotating load of varying magnitude. A conventional tumbler is a convenient illustration of such a load. The exact construction of the tumbler is not critical and for convenience is shown as comprising an open front frame of welded together steel members and a drum or drums mounted in the frame for rotation about a horizontal axis. The frame includes a pair of horizontally spaced front uprights 1, 2 and a pair of similarly spaced rear uprights one of which is shown at 4. A pair of parallel vertically spaced horizontal cross members 5, 6 extend between and connect the rear uprights. At the drive end of the machine the horizontal members 5, 6 project cantilever fashion beyond the rear upright 4 and support an outrigger frame which encloses the drive. This outrigger frame comprises vertically spaced horizontal members 7, 8 and horizontally spaced vertical members 9, 10 all connected together at their ends to form an open rectangle. The outrigger vertical members 9, 10 thus parallel main front and rear uprights 2, 4 respectively. The ends of the member 10 are fast to the outer ends of the main horizontal frame members 5, 6 and the ends of the outrigger member 10 are connected to the main upright 2 by supplemental frame members 11, 12. Horizontal end cross members, two of which are indicated at 14, 15 extend between and connect the front and rear uprights of the machine. The frame members are fitted with sheet metal panels one of which is indicated at 17, Fig. 4, that form a partial enclosure for the tumbling drum or drums indicated generally at 18, 19 but not shown in detail. These drums may be fastened together in end to end relation as by bolts (not shown) received through a juxtaposed radial flanges 20, 21. At their opposite ends the drums have suitably reinforced end members fast on projecting shafts 22, 23 by means of which the drums are supported. The drums are of hexagonal or other noncircular cross section to obtain the desired shifting of contents when rotated. Each drum is formed with one or more access or loading openings and suitable closures (not shown) for sealing the same.

The shafts 22, 23 are received through bushings or bearings in blocks 24, 25 supported on horizontal cross members 26, 27 mounted between the front and rear uprights of the main frame. Reinforcing diagonals are provided in the frame for the cross members 26, 27, being shown at 28, 29 for the member 27. A suitable diagonal brace 39, Fig. 3, extends between the rear uprights of the frame to provide lateral stability.

The shaft 23 extends through the pillow or journal block 25 and projects cantilever fashion into the drive enclosure provided between the main frame and the outrigger frame. This shaft may be hollow as shown in Fig. 4, thereby effecting weight reduction. It extends through tubular output shaft or quill 30 of a speed reducer assembly contained in a cast metal gear housing 31. This speed reducer may be of conventional construction, the H series speed reducers as produced by George P. Dorris Co., St. Louis, Missouri, being satisfactory. The speed reducer is so constructed that the output shaft or quill 30 is journalled in the side walls of the casing 31 and by reason of being mounted on the machine shaft 23 constitutes a support for the speed reducer casing and its contents. The speed reducer output quill 30 and the tumbler shaft 23 are secured together as by key 32 to rotate in unison.

Inside and enclosed by the casing 31 is a gear train comprising main or relatively large diameter gear 33 fast on the output quill or shaft 30, a drive pinion 34 fast on input shaft 35, and an intermediate or double gear which drivingly connects the small input and the large output gears. The intermediate gear comprises a large diameter part 36 the teeth of which mesh with the teeth of the input pinion 34 and a small diameter portion 37 the teeth of which mesh with the teeth of the output gear 33. The input shaft 35 and a shaft 38 which carries the intermediate gear are journalled at their ends in bushings carried by the side walls of the speed reducer casing 31. Various speed reductions are feasible depending upon the pitch diameters of the gears and pinions used. A suitable speed reduction and that employed in the example illustrated is 19.6.

The intermediate shaft 38 and the input shaft 35 rotate about axes parallel to one another and to the output shaft or quill 30. The shaft 35 projects from the casing 31 and mounts an external pulley 40 of relatively large diameter by means of which the input shaft and pinion are driven by belt from the the prime mover. All of the shafts 30, 35 and 38 are suitably restrained against axial shifting relative to one another and to the speed reducer casing 31 so as to retain the parts in assembled relation. The casing is formed with suitable front and rear access openings normally closed by covers 41, 42 and is made fluid tight by suitable seals about the shaft ends. Oil or grease is retained within the casing for lubrication.

To actuate the tumbler drum or drums a prime mover in the form of an electric motor 43 is mounted as by bolts 44 on a plate 45 suspended by hinge 46 from the top cross member 5 to swing about a horizontal axis. Output shaft 47 of the motor carries a variable diameter pulley assembly 48. An endless flexible V-belt 50 trained about the variable diameter pulley 48 and the relatively large diameter pulley 40 on the speed reducer input shaft connects the motor to the speed reducer. The variable diameter pulley 48, such as marketed by Speed Selector Inc., Cleveland, Ohio, comprises a pair of confronting circular plates 51, 52 yieldingly urged toward one another as by a helical coil spring 53 concentric to and carried by the motor shaft 47, the plate 51 being fast on the shaft, the plate 52 being splined for axial movement. The pulley plates 51, 52 have confronting surfaces that define an annular groove radially tapering in width and matching the taper of the V-belt 50. Upon increase in belt tension the belt 50, by reason of its tapered section, spreads apart the plates 51, 52 against the force of the spring 53 which biases the plates together, thus reducing the effective diameter of the driving pulley.

To shift the motor 43 bodily toward or away from the speed reducer casing 31 and thereby change the ratio between the effective diameters of the pulleys 40, 48 with a corresponding change in the drive ratio, the plate 45 is held against the forces in the belt 50 by an adjusting rod 54. This rod has a free running fit through aligned openings in and is supported by brackets 55, 56 fast to the machine uprights 2, 4 respectively. The right hand end of the rod 54 (Figs. 2, 6) extends transversely through and threadedly engages a circular sectioned fulcrum bar 57 held by U-bolts 58 across a notch 59 in the lower end of the motor suspension plate 45. The U-bolts 58 permit slight rotative movement of the bar 57 relative to the plate 45 so that in shifting the motor plate by rotating the adjusting rod 54 there is no binding of the latter in the bar 57.

The adjusting rod 54 is conveniently formed in two sections arranged in end to end relation and connected by a resilient coupling indicated at 60 which accommodates slight lateral displacement of the threaded end of the rod incidental to swinging of the motor suspension plate 45. The rod 54 is suitably restrained against axial movement to withstand the thrust forces imposed by the tension in the belt 50. The rod may, for example, carry a collar 62 which bears against the bracket 55 and is made fast to the rod as by a set screw 63.

The electric motor 43, the adjustable diameter pulley 48 which it carries, and the adjustable plate 45 on which it is mounted are all located outside the space defined by the main and outrigger frames of the machine, the speed reducer mechanism 31 being located within such space. The connecting belt 50 thus extends through an opening 61 between the rear upright 4 of the main frame and the outrigger upright 10.

As a heavy load of abrading or polishing particles and items to be abraded or polished is rotated in the drums 18, 19 the erratic slipping, rolling and tumbling of the particles comprising such load produces high magnitude load variations on the main shaft 23 with resultant high torque reactions on the speed reducing mechanism 31. Such intermittent and variable loads tend to rotate the speed reducer 31 bodily and with irregular forces about the machine shaft 23 on which it is suspended. Such torque reactions not only create forces that cause heavy wear on the various bushing and bearings for the shafts 30, 35 and 38 but also tend to cause chipping or even breaking as well as high wear of the gear teeth. In accordance with the present invention the speed reducer housing 31 is so mounted as to permit limited rotative movement of the speed reducer as a unit relative to the mounting shaft 23, such bodily rotative movements being cushioned or resiliently resisted so as to absorb the fluctuating loads being transferred through the output quill or shaft 30.

To permit limited rotative movement or oscillation of the speed reducer casing 31 about the mounting shaft 23, while holding the speed reducer against complete rotative movement, a torque resisting link or bar 65 is connected between the speed reducer casing 31 and the machine frame. The link bar is formed at one end with an eye 66 through which is received a shouldered screw 67 threaded into a tapped hole in one wall of the casing at the bottom of the latter and spaced from the rotational axis of the shaft 23. The body of the rod 65 is received with a free running fit through an opening 68 in a bracket 69 made fast to the machine frame as by being welded or otherwise secured to the bracing diagonal 29.

The motor 43 is energized from a suitable source of electrical current through conventional controls (not shown). When the motor is energized to rotate counterclockwise, as viewed in Fig. 2, thereby similarly rotating the large pulley 40 on the input shaft 35 of the speed reducer in the direction of arrow 70, the tumbling drums 18, 19, or other load, are actuated for counterclockwise rotation by the gear train output shaft 30 and the machine shaft 23. When so actuated, the load reacts on the speed reducer housing 31 tending to shift or rotate the latter clockwise as viewed in Figures 2 and 4. Turning and swinging of the speed reducer housing 31 under the influence of the torque load transmitted through the machine shaft 23 is resisted by the resilient connection comprising the torque bar or rod 65 and opposed helical coil compression springs 72, 73. These springs are disposed on opposite sides of the bracket 69 in surrounding relation to the bar 65 so as to be freely movable over the latter in the working of the resilient connection. The adjacent or inner ends of the springs react against the opposite sides of the support bracket 69; the outer ends of the springs react against and are confined by adjusting nuts 74 threaded on the rod 65. By tightening one pair and loosening the other pair of the adjusting nuts, the normal or unstressed position of the speed reducer housing 31 on the machine shaft 23 can be adjusted relative to the machine frame. When the machine is operating heavily loaded, one or the other of the cushion springs 72, 73 is compressed beyond its normal position, depending upon the direction of the torque reaction between the machine shaft 23 and the speed reducer housing 31. The other or companion spring is then unstressed or released partially or wholly from its normal condition.

As the particles loaded in the tumbling drums 18, 19 shift during a tumbling operation there is wide variation in the power required to drive the drums. The power requirement may fluctuate several times during each revolution of the drums. Variations in the torque reaction between the speed reducer casing 31 and the machine frame are manifested in variations in the compression of the springs 72, 73 which balance such reaction through the rod 65.

One of the springs, the spring 72, not only cushions oscillation of the speed reducer 31 about the axis of the machine shaft 23 but also maintains tension in the endless flexible belt 50. Actuation of adjusting hand wheel 75 to turn the speed regulating rod 4 so as to swing the mounting plate 45 away from the machine frame has the effect of moving the motor shaft 47 away from the input shaft 35 of the speed reducer. This relative separation of the shafts tensions the belt and results in spreading of the plates 51, 52 of the adjustable diameter pulley 48, thereby reducing the effective diameter of the latter and increasing the driving ratio between the shafts. Since the sheave plates 51, 52 are held apart by the belt against the force of the spring 53, the belt tension is automatically increased when the drive ratio is increased, and the increased belt tension produces a proportional increase in the compressive force exerted on the torque rod spring 72. Thus when the speed ratio between the pulleys 40 and 48 is adjusted to reduce the speed of the tumbling drums, there automatically results an increase in the compression of the spring 72 which maintains the belt tension. Furthermore, in the event an abnormal load of high magnitude is imposed on the speed reducer by the machine main shaft 23, the tendency of the speed reducer to rotate bodily clockwise as viewed in Fig. 2 draws the belt 50 into the adjustable pulley 48, reducing the effective diameter of the latter and thereby increasing the driving ratio between the pulleys.

Although the operation of the device has been described with reference to counterclockwise rotation of the shaft 47 of the prime mover and similar rotation of the input shaft 35 of the speed reducer, it is apparent that, regardless of the direction of rotation, the bodily shifting or oscillating of the speed reducer unit 31, yieldingly opposed and damped by the springs 72, 73, permits the machine to carry heavy irregular shock loads.

The present invention thus provides a resilient shock absorbing drive for machines having a rotary shaft that is subjected to variable and irregular shock loads, the drive being adapted to absorb the shocks and momentary overloadings by yielding in such a way as to first absorb and then release the energy of the shock load and thus distribute the load over a greater portion of the shaft rotation. The device incorporates a simple speed adjustment which can be actuated while the machine is in operation to vary the rotary speed of the tumbling drums or other rotary driven parts. Since the speed reducer is mounted on and wholly supported by the main shaft of the machine, automatic alignment of parts is achieved without the use of special gauges or tools in assembly, thereby reducing the cost of the machine in which the present drive is incorporated.

In accordance with the patent statutes the principles of the present invention may be utilized in various ways, numerous modifications and alterations being contemplated, substitution of parts and changes in construction being resorted to as desired, it being understood that the embodiment shown in the drawings and described above represents the best known mode of practicing the invention but is given merely for purposes of explanation and illustration without intending to limit the scope of the claims to the specific details disclosed.

What I claim and desire to secure by Letters Patent of the United States is:

1. In a machine having a frame, a relatively low speed driven shaft journaled in the frame and subject to irregular work loads and a prime mover supported by the frame and having a relatively high speed drive shaft, a drive system connecting said drive shaft to the driven shaft to actuate the latter; said system including a speed reducer comprising a gear train, housing means supporting the gear train and input and output shafts journaled in the housing for rotation about spaced parallel axes and operatively connected by the gear train for rotation in unison at a predetermined speed ratio; the output shaft being drivingly related to the driven shaft, the reducer being mounted for bodily swinging movement relative to the frame about the axis of the output shaft due to torque reaction, a pulley fast on the input shaft, a variable diameter pulley on the drive shaft, an endless belt trained about the pulleys to effect a driving connection between the drive and input shafts through the pulleys, said variable pulley being adapted yieldingly, automatically and progressively to decrease its effective diameter upon increase in belt tension and increase such diameter upon decrease in belt tension; the arrangement of the reducer with respect to its mount being such that under a work load the torque reaction swings the reducer in a forward direction increasing the effective distance between the input shaft and the drive shaft and increasing the belt tension to thereby effect said decrease in pulley diameter and, under a reverse load, the torque reaction swings the reducer in a reverse direction decreasing such distance and the belt tension to thereby effect said increase in pulley diameter, said decrease and increase in effective pulley diameter permitting increase and decrease in the distance between the drive and input shafts to accommodate said swinging of the reducer while maintaining said belt drive connection, and means connected between the frame and the reducer to control the swinging of the reducer, said connecting means including first resilient means tending to swing the reducer in said forward direction to augment the work load torque reaction on the reducer, and second resilient means opposing swinging motion of the reducer in said one direction and thereby acting in opposition to the torque reaction on the reducer resulting from such a work load whereby yielding of said first and second resilient means permits swinging of the reducer in automatically effecting variation of the belt tension and the driving ratio between the pulleys in response to work load variations manifested by changes in the imparted torque loads and said first and second resilient means also absorb shock loads by cushioning respectively the reverse and forward swinging of the reducer caused by work load variation.

2. In a machine as in claim 1 the variable diameter pulley comprising a pair of circular plates, spring means yieldingly urging the plates toward one another, said plates having confronting surfaces defining an annular groove tapering in width radially, and the belt having tapered sides matching the taper of the pulley plate surfaces, said spring means being in opposition to the first resilient means through the belt, forward swinging of the reducer induced by work load increases being cushioned by the spring means in conjunction with the second resilient means and reverse swinging being cushioned by the first resilient means.

3. In a machine as in claim 1 the support for the prime mover including means for shifting it bodily toward and away from the reducer to vary the distance between the drive and input shafts and thereby alter the driving ratio independently of the variation effected by work load variations.

4. In a machine as in claim 1, the connecting means between the reducer and the frame comprising an apertured plate, an elongated bar projected through the plate aperture and having a free fit therein, said first and second resilient means comprising compressed helical coil springs embracing the bar, disposed one on each side of the plate and reacting against the plate and the bar in opposition to one another so that swinging of the reducer increases the compression of one such helical spring while relieving the compression of the other and so that one such helical spring opposes the belt tension reaction tending to swing the reducer while another such helical spring opposes work load torque reaction.

References Cited in the file of this patent

UNITED STATES PATENTS

| | | |
|---|---|---|
| 1,921,296 | Harkness | Aug. 8, 1933 |
| 2,258,776 | L'Hommedieu et al. | Oct. 14, 1941 |
| 2,556,259 | Dorris et al. | June 12, 1951 |
| 2,669,404 | Howard | Feb. 16, 1954 |
| 2,753,969 | Chung | July 10, 1956 |